(12) United States Patent
Hsu et al.

(10) Patent No.: US 9,154,828 B2
(45) Date of Patent: Oct. 6, 2015

(54) METHOD FOR CONTROLLING TELEVISION DEVICE AND TELEVISION CONTROL SYSTEM

(71) Applicant: AmTRAN TECHNOLOGY CO., LTD, New Taipei (TW)

(72) Inventors: Yueh-Han Hsu, New Taipei (TW); Kun-Chin Chien, Taipei (TW)

(73) Assignee: AMTRAN TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/248,118

(22) Filed: Apr. 8, 2014

(65) Prior Publication Data

US 2015/0189363 A1     Jul. 2, 2015

(30) Foreign Application Priority Data

Dec. 27, 2013   (TW) .............................. 102148868 A

(51) Int. Cl.
*H04N 7/16* (2011.01)
*H04N 21/422* (2011.01)
*H04N 21/475* (2011.01)

(52) U.S. Cl.
CPC ... *H04N 21/42226* (2013.01); *H04N 21/42221* (2013.01); *H04N 21/42222* (2013.01); *H04N 21/4751* (2013.01); *H04N 21/4755* (2013.01)

(58) Field of Classification Search
CPC .................................................. H04N 21/4755
USPC .......................................................... 725/10
See application file for complete search history.

(56) References Cited

U.S. PATENT DOCUMENTS

2008/0007212 A1*  1/2008  Theytaz et al. ............... 320/107
2008/0141293 A1*  6/2008  Blanchard et al. .............. 725/28

* cited by examiner

*Primary Examiner* — Nasser Goodarzi
*Assistant Examiner* — Michael Hong
(74) *Attorney, Agent, or Firm* — Muncy, Geissler, Olds & Lowe, P.C.

(57) ABSTRACT

A method for controlling a television device comprises the following steps. A portable device with a wireless power receiver module is provided. A display control module of the television device receives a parental control signal from a remote control module of the portable device. A feedback detector unit of a wireless power transmitter module of the television device detects whether the wireless power receiver module is located within a predetermined range so as to generate a first detection result. The display control module selectively enables a parental control function according to the parental control signal and the first detection result. The feedback detector unit again detects whether the wireless power receiver module is located within the predetermined range so as to generate a second detection result. Finally, the television device is controlled to turn on, turn off or enter into a standby mode based on the second detection result.

10 Claims, 7 Drawing Sheets

METHOD FOR CONTROLLING TELEVISION DEVICE AND TELEVISION CONTROL SYSTEM

CROSS-REFERENCE TO RELATED APPLICATIONS

This non-provisional application claims priority under 35 U.S.C. §119(a) on Patent Application No. 102148868 filed in Taiwan, R.O.C. on Dec. 27, 2013, the entire contents of which are hereby incorporated by reference.

TECHNICAL FIELD

The present disclosure relates to a method for controlling a television device and a television control system, particularly to a method and a system with parental control functions.

BACKGROUND

Generally speaking, traditional remote controls must be equipped with commercially available batteries for supplying electric power, so they can be used to remotely select channels or set functions of televisions. With popularity of smart televisions, in addition to common channel selection buttons, accessory remote controls have integrated QWERTY keyboards for facilitating users to operate application programs having internet functions. Such remote controls used for the smart televisions transmit signals of key buttons through a Bluetooth interface and therefore consume more electric power than those using an infrared interface. While using ordinary batteries, users need to frequently replace them. In other words, ordinary batteries with limited electric power cause problems of environmental protection and also make users constantly change batteries for assuring normal operation of remote controls.

On the other hand, currently available televisions having parental control functions nearly utilize user-configured passwords to initiate channel blocking functions, making specific channels un-viewable. However, if other persons have known the passwords, they can easily unlock the parental control. Moreover, the current parental control function cannot latch the entire television into a disabled state. For example, children can turn on televisions at any time through remote controls or directly pressing buttons on the televisions. Though children cannot watch TV programs, they still can utilize other functions of televisions (such as playing contents from disk players or video game consoles on TV screens). Therefore, merely blocking channels shall not prevent children from using televisions.

SUMMARY

In view of above problems, the present disclosure discloses a method for controlling a television device, to prevent children from turning on or watching televisions at will.

The present disclosure further discloses a television control system to render the batteries of a remote control rechargeable and achieve objectives of being environmentally friendly.

According to one embodiment of this disclosure, a method for controlling a television device is provided. The method is suitable for controlling a television device and comprises the following steps. A portable device having a wireless power receiver module is first provided. Then, a parental control signal is received. A detection process is conducted to determine whether the wireless power receiver module is located within a predetermined range so as to generate a first detection result. A parental control function is then selectively enabled based on the parental control signal and the first detecting result. The detection is performed again to determine whether the wireless power receiver module is located within the predetermined range so as to generate a second detection result. Finally, the television device is controlled to turn on, turn off or enter into a standby mode according to the second detection result.

According to one embodiment of this disclosure, a television control system is provided and comprises a portable device and a television device. The portable device comprises a power supply module, a remote control module, and a wireless power receiver module. The television device comprises a wireless power transmitter module and a display control module. The remote control module is coupled to the power supply module and adapted for emitting a parental control signal. The wireless power receiver module is coupled to the power supply module and adapted for sensing variation of a magnetic field to generate an induced electromotive force, so as to electrically charge the power supply module. The wireless power transmitter module has a feedback detector unit that detects whether the wireless power receiver module is located within a predetermined range. The display control module, coupled to the wireless power transmitter module, is adapted for receiving the parental control signal and, according to a detection result from the feedback detector unit, controlling operation of the television device or selectively enabling a parental control function.

In short, the method and the system of this disclosure latch the television device into a disabled state or an enabled state, not only blocking certain restricted program channels but also thoroughly preventing the television device from being used for gaming or other purposes, thus avoiding children to turn on the television device through pressing buttons on the television device.

BRIEF DESCRIPTION OF THE DRAWING

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
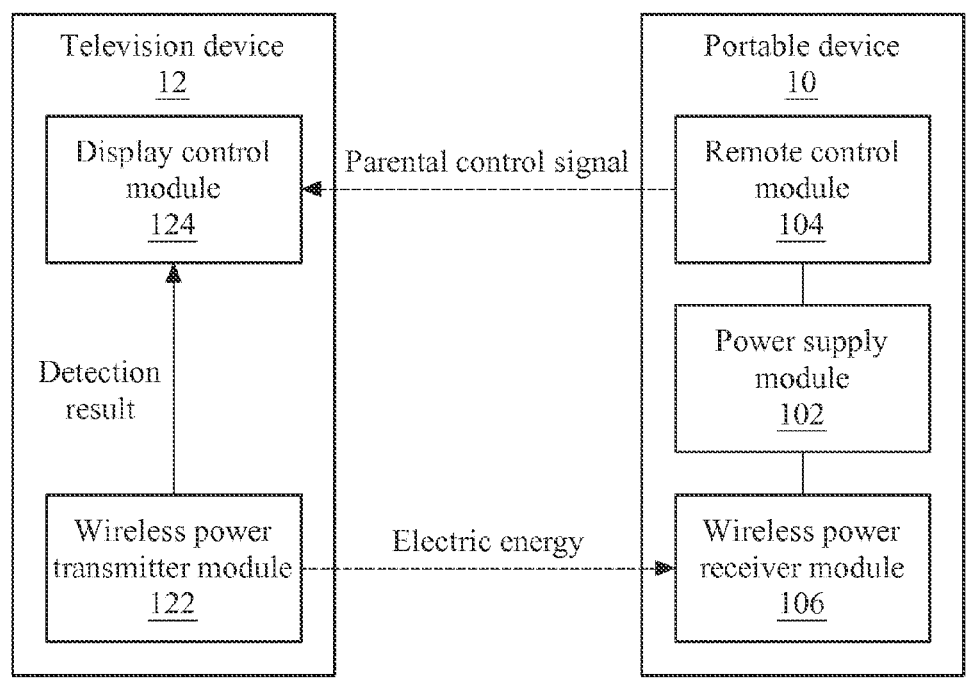
FIG. 1 is a functional block diagram of a television control system in accordance with an embodiment of the present disclosure.

Please refer to FIG. 1, a functional block diagram of a television control system according to one embodiment of the present disclosure. As shown in the block diagram, a television system 1 comprises a portable device 10 and a television device 12. The portable device 10 comprises a power supply module 102, a remote control module 104, and a wireless power receiver module 106. The power supply module 102 is coupled to both the remote control module 104 and the wireless power receiver module 106. The television device 12 comprises a wireless power transmitter module 122 and a display control module 124 coupled to the wireless power transmitter module 122.

The portable device 10 may be a remote control with a Bluetooth or infrared interface and employed to switch channels, adjust volume, connect to the Internet, and play back media. In particular, the portable device 10 is, but not limited by the present disclosure to, a wirelessly rechargeable remote control. In another embodiment, the portable device 10 is, for example, a smartphone or tablet with remote control functionality.

The power supply module 102 in the portable device 10 is adapted for outputting electric energy to the remote control module 104 and for receiving charging power from the wireless power receiver module 106.

The remote control module 104 is adapted for emitting a parental control signal to the display control module 124. For example, the parental control includes a function of blocking certain channels, making specific channels un-viewable. Users need to input passwords for closing the blocking function. Moreover, turning-on or turning-off of the television device 12 may be secured through the parental control. The remote control module 104 may be a signal transmitting unit having Bluetooth, infrared or radio frequency modulation transmission capability, and the present disclosure does not limit the type of such transmission capability.

The wireless power receiver module 106 is configured to sense variation of a magnetic field to generate an induced electromotive force for electrically charging the power supply module 102. In more detail, within the wireless power receiver module 106 there is a coil that senses the magnetic field variation generated by the wireless power transmitter module 122 and converts it to electric energy (in the form of an induced electromotive force, for example). The induced current may be rectified into a direct current by an internal rectifier, and the direct current is then regulated by a stabilizer so as to charge batteries in the power supply module 102. The present disclosure does not limit the manner the wireless power receiver module 106 charges the power supply module 102.

The television device 12 may be an LCD (liquid crystal display) or plasma television. For example, the television device 12 may further include front-end TV signal decoding, back-end audio/video processing, peripheral input/output controlling, and/or an application software platform. The present disclosure does not limit circuit components, signal processing/controlling and the type of the platform contained within the television device 12.

The wireless power transmitter module 122 in the television device 12 can transport electric energy to the wireless power receiver module 106 for charging the power supply module 102 though generating the magnetic field variation. In addition to the charging function, the wireless power transmitter module 122 can still be employed to detect whether the portable device 10 is located within a predetermined range and send a detection result to the display control module 124.

The wireless power transmitter module 122 may be a wireless power emitter complying with the Qi standard, which is specified by Wireless Power Consortium (WPC) as a communication standard applied to a short-distance, low-power wireless transmission.

Figure 3A:
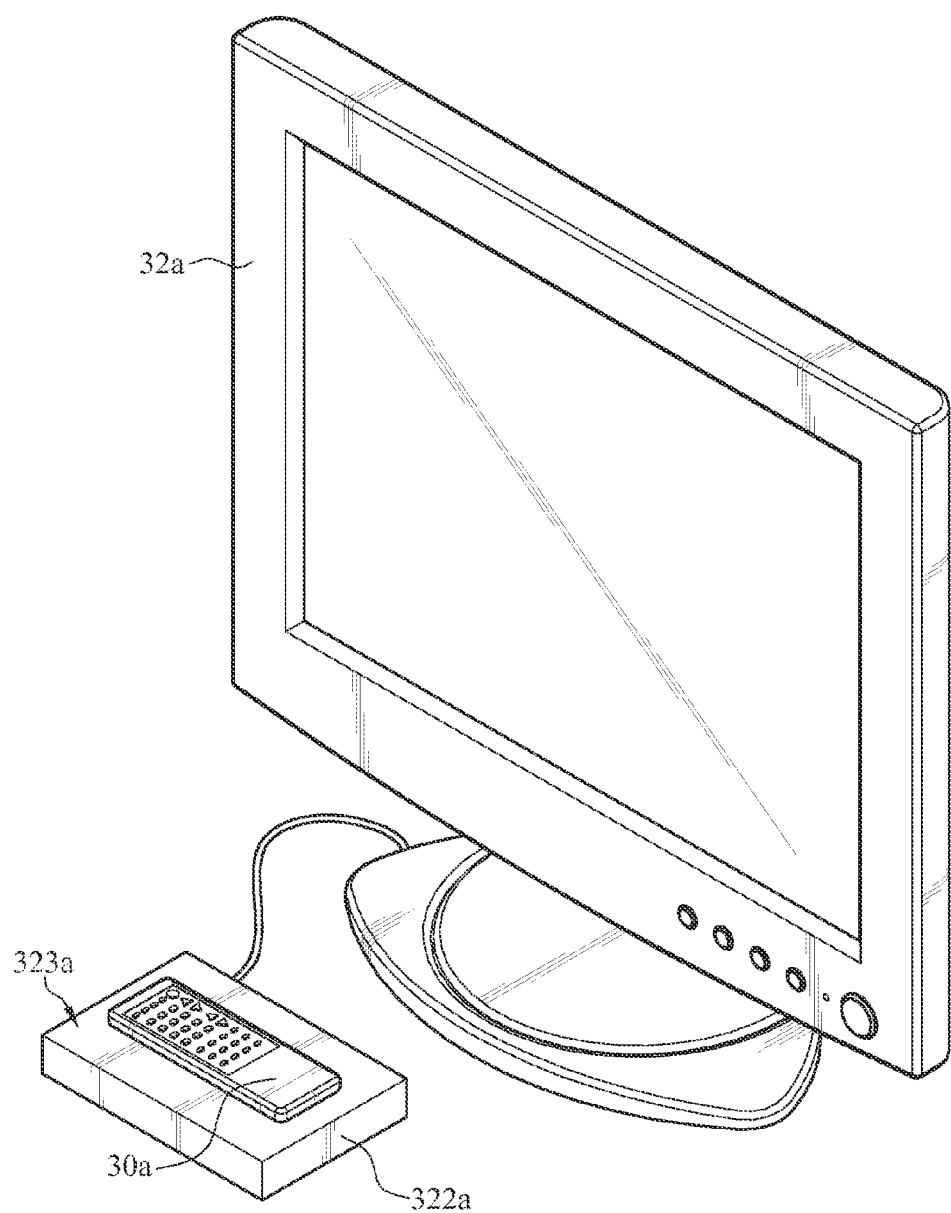
FIGS. 3A, 3B, and 3C are schematic diagrams of appearances of respective television control systems in accordance with various embodiments of the present disclosure.
Figure 3B:
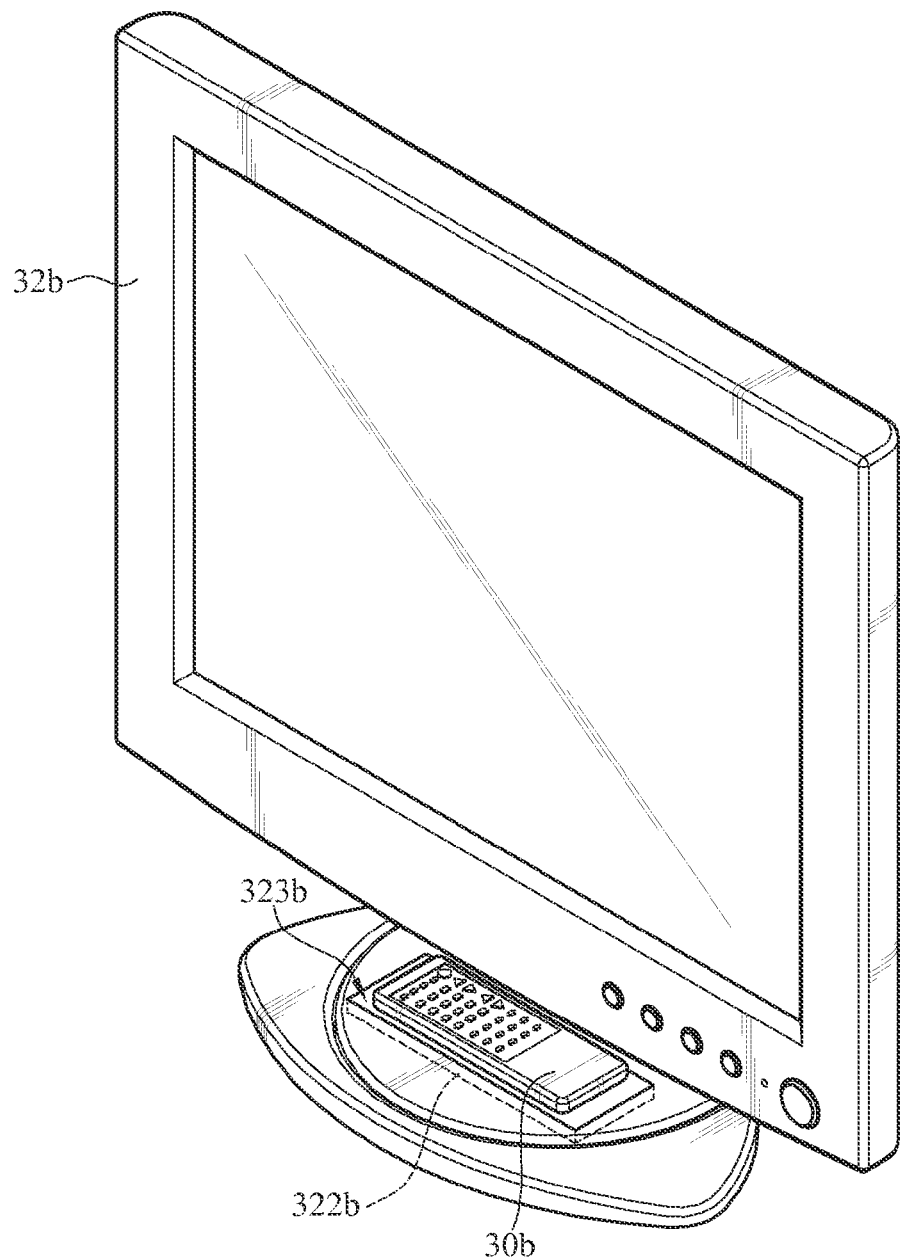
Figure 3C:
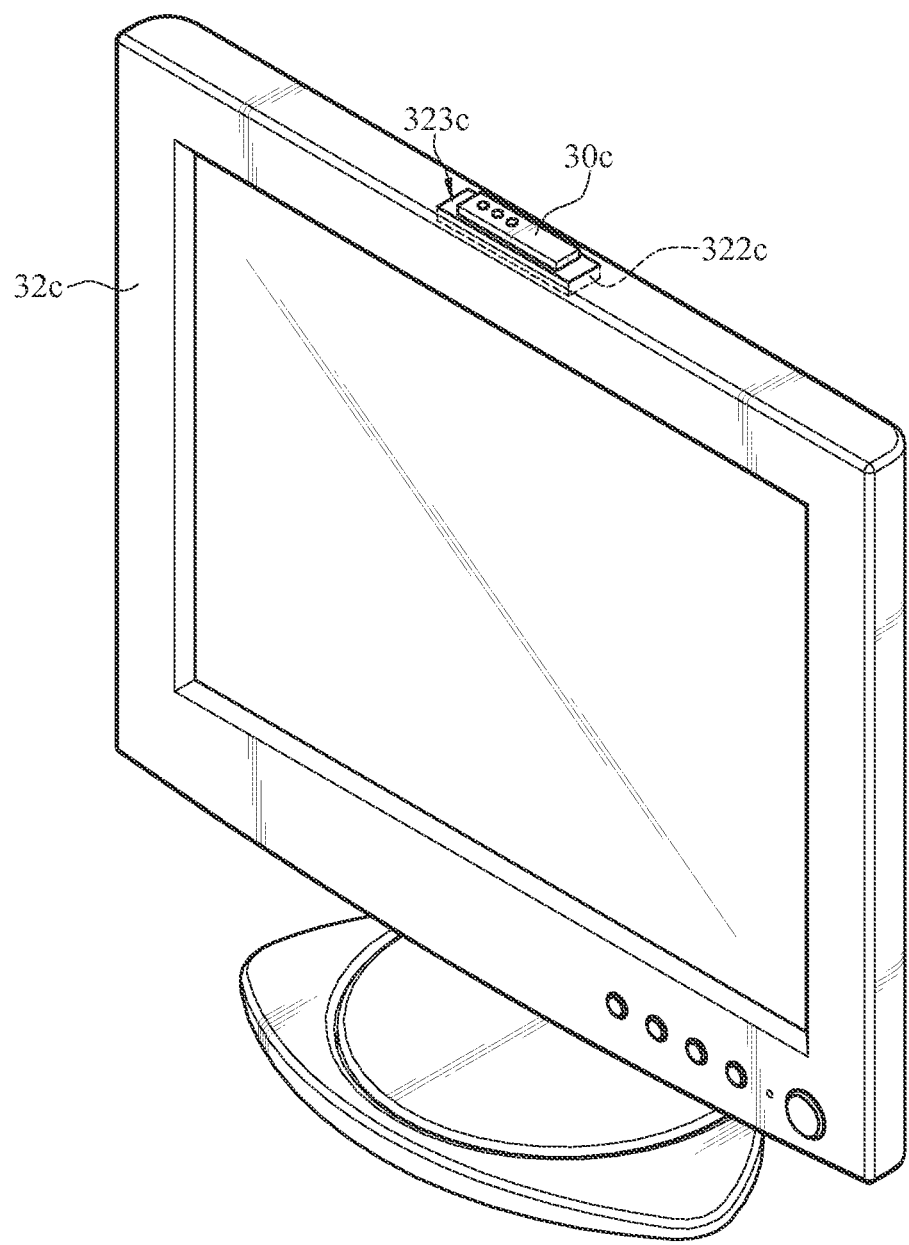

As far as a practical example is concerned, the predetermined range in the disclosure may be the same as those shown in FIG. 3A to 3C. Please refer to FIG. 3A to 3C. FIGS. 3A, 3B, and 3C are schematic diagrams of appearances of respective television control systems according to various embodiments of the present disclosure. As shown in one figure, a wireless power transmitter module 322a is placed outside a television device 32a in an externally connected manner (e.g. externally connected in front of the television device 32a). A predetermined range within which a portable device 30a could be found locating may be a spatial region enclosed by the surface 323a and a strip perpendicularly extending from the edges of the surface 323a. The strip has a threshold height which, for example, may be 0.2, 0.5 or 0.8 centimeters, measuring from the surface 323a. However, the present embodiment is not limited to the spatial region, and a person skilled in the art may freely make some modifications to the predetermined range. Please refer to another embodiment in FIG. 3B, a wireless power transmitter module 322b may be embedded in the base of a television device 32b. A predetermined range within which a portable device 30b could be found locating may be a spatial region enclosed by the surface 323b and a strip perpendicularly extending from edges of the surface 323b and having a threshold height. In yet another embodiment of FIG. 3C, a wireless power transmitter module 322c may be disposed in a non-base portion of a television device 32c (for example, above the screen of the television device 32c). A predetermined range within which a portable device 30c could be found locating may be a spatial region enclosed by the surface 323c and a strip perpendicularly extending from edges of the surface 323c and having a threshold height.

The display control module 124 is adapted for controlling the television device 12, playing video/audio contents and receiving the parental control signal. The display control module 124 is also adapted for selectively enabling a parental control function based on the detection result outputted by the wireless power transmitter module 122. In other words, the display control module 124 can be configured to select watching a TV program or movie, or receiving the parental control signal. Upon reception of the parental control signal, the display control module 124 enables the parental control function if the wireless power transmitter module 122 determines that the portable device 10 is within the predetermined range.

In one embodiment, once the display control module 124 receives the parental control signal and the detection result indicates that the wireless power transmitter 122 finds the portable device 10 is within the predetermined range, during a default time period, the display control module 124 enables the parental control function and charges the portable device 10.

In another embodiment, with the parental control function enabled, the display control module 124 automatically stops video/audio playing, turns off the television device 12 or controls the television device 12 entering into a standby mode when the wireless power transmitter 122 sends out a signal representing that the portable device 10 has been found outside the predetermined range. For example, the display control module 124 will automatically stop video/audio playing and turn off the television device 12 after a default time. The default time may be 5, 10 or 15 seconds and is not limited by the disclosure. Furthermore, the display control module 124 will also latch the television device 12, making buttons on the television device 12 functionless, so that users cannot turn on the television device 12 by pressing any button on the television device 12. Under such circumstances, if a user (for instance, a parent) initiates the parental control function and take the remote control 10 away (outside the predetermined range), other users (such as children) are unable to play video/audio contents on the television device 12.

Figure 2A:
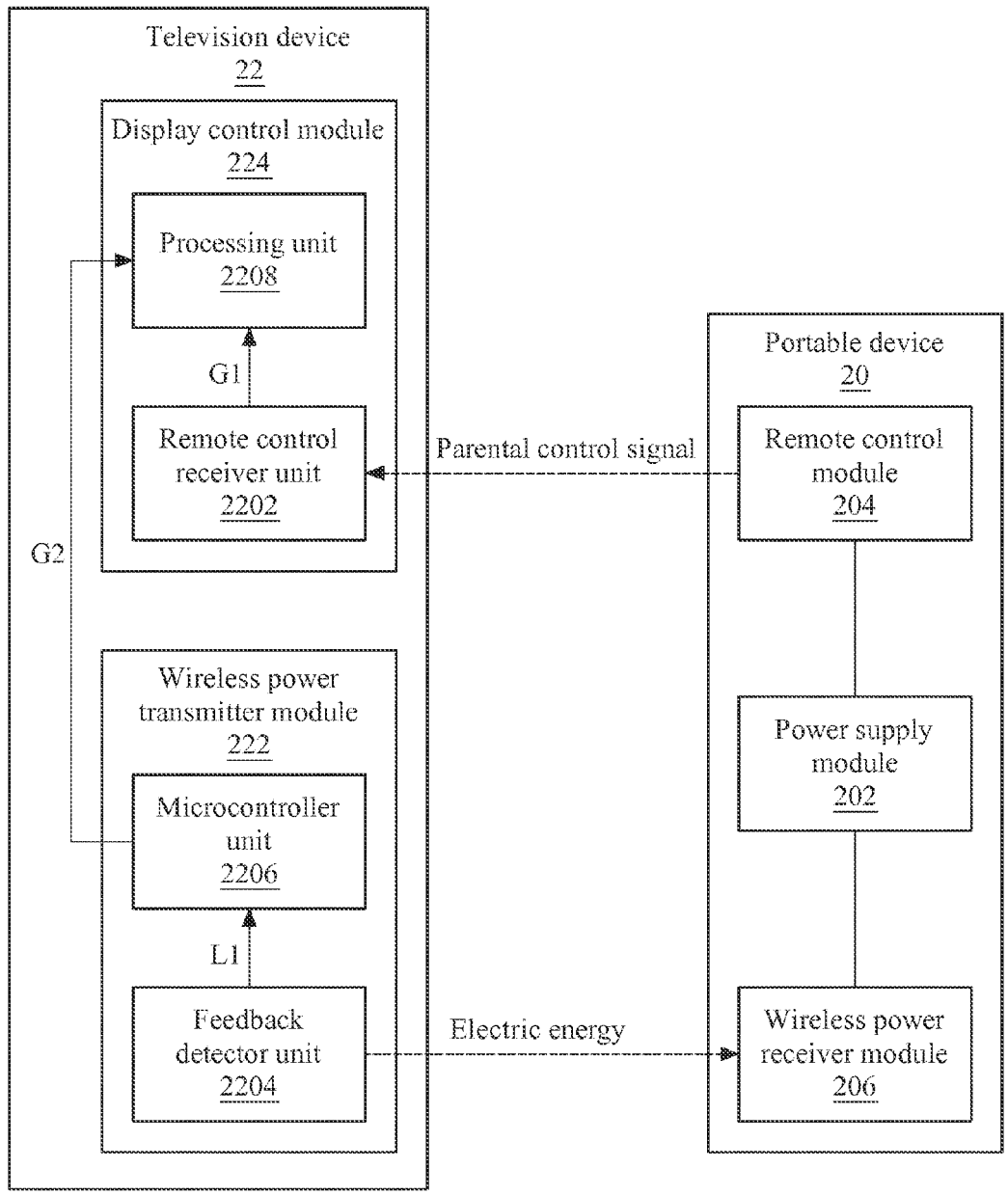
FIG. 2A is a functional block diagram of a television control system in accordance with another embodiment of the present disclosure.

Please refer to FIG. 2A, a functional block diagram of a television control system according to another embodiment of the present disclosure. A television control system 2 comprises a television device 22 and a portable device 20 similar to the portable device 10 in the above embodiment. The following description is made merely in connection to certain components. In the television device 22, a wireless power transmitter module 222 comprises a feedback detector unit 2204 and a microcontroller unit 2206, and a display control module 224 comprises a remote control receiver unit 2202 and a processing unit 2208.

The remote control receiver unit 2202 is adapted for receiving the parental control signal so as to generate a first control signal G1 which is subsequently transmitted to the processing unit 2208. In practice, the remote control receiver unit 2202 may be a Bluetooth, infrared, or radio frequency modulation receiver, and the disclosure does not limit the type of the remote control receiver unit 2202. The remote control receiver unit 2202 generates the first control signal G1 after it receives the parental control signal emitted from the remote control module 204.

Figure 2B:
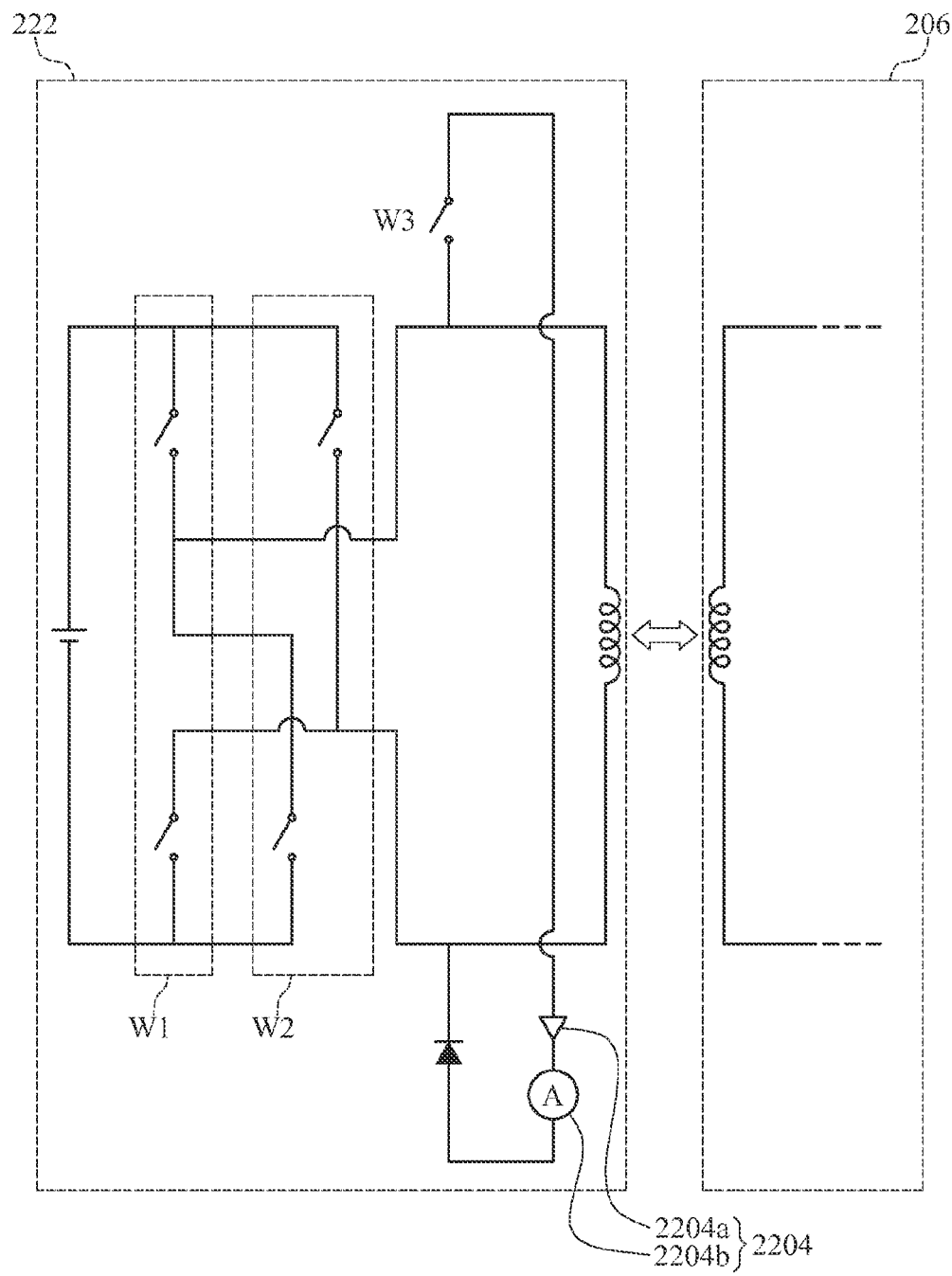
FIG. 2B is a circuit diagram of a feedback detector unit in accordance with another embodiment of the present disclosure.

The feedback detector unit 2204 detects whether the portable device 20 is located within a predetermined range, thereby generating a feedback detection signal L1. In practice, the feedback detector unit 2204 may be a circuitry shown in FIG. 2B, the circuitry measuring a coil current in the wireless power receiver module 206 so as to generate the feedback detection signal L1 accordingly. In FIG. 2B, switches W1 and W2 are alternately closed to make the wireless power transmitter module 222 generate magnetic field variation for transporting electric energy to the wireless power receiver module 206. During intervals between closing the switch W1 and the switch W2, a switch W3 is closed so that an amplifier 2204a and an ammeter 2204b can amplify and measure an induced coil current in the wireless power transmitter module 222. In particular, the illustrated circuitry of the feedback detector unit 2204 in this embodiment is just one feasible implementation. In other embodiments, the feedback detector unit 2204 can also be a component capable of measuring other characteristics of the wireless power receiver module 206.

The microcontroller unit 2206 is coupled to the feedback detector unit 2204. The microcontroller unit 2206 receives the feedback detection signal L1 and judges whether the portable device 20 is located within the predetermined range, based on the numerical value of the signal L1. Afterwards, the microcontroller unit 2206 generates a second control signal G2 representing either a "positive" or a "negative" result. The second control signal G2 is then sent to the processing unit 2208. In practice, the microcontroller unit 2206 may be a 4-bit, 8-bit or 16-bit micro controller unit, and the disclosure does not limit the type of the microcontroller unit 2206.

The processing unit 2208 is coupled with the remote control receiver unit 2202 and the microcontroller unit 2206. Based on the first control signal G1 and the second control signal G2, the processing unit 2208 enables the parental control function. In practice, the processing unit 2208 may be a digital signal processor (DSP) specially designed to convert information (such as audios, videos, etc.) originally in analog format into digital signals for further processing, and the disclosure does not limit the type of the processing unit 2208.

The foregoing embodiments have explained hardware structures used for implementing a television control method provided in the disclosure. In the following text, another embodiment is illustrated to detail the method for controlling a television device in the disclosure.

Figure 4:
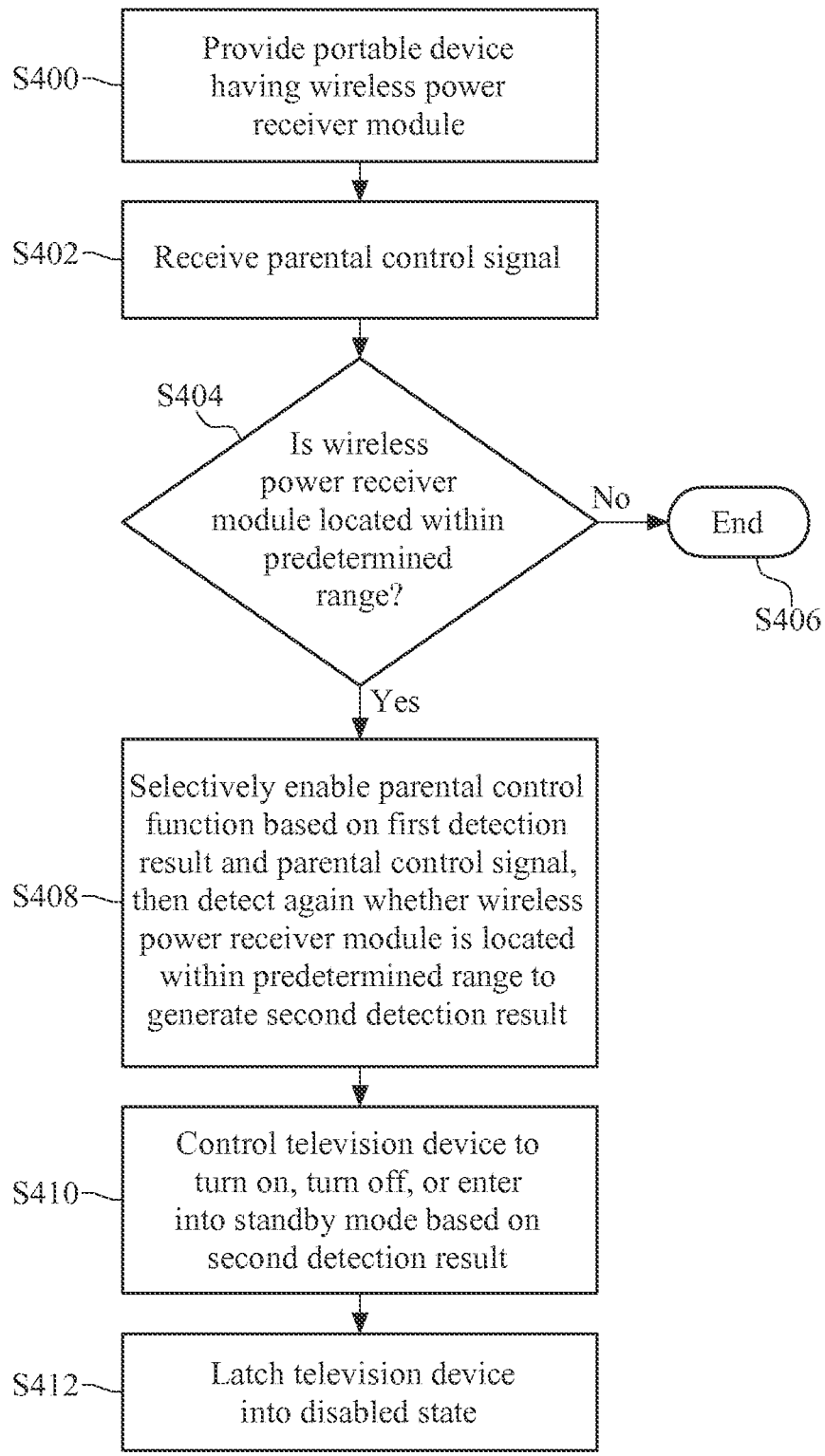
FIG. 4 is a flowchart of a method for controlling a television device in accordance with an embodiment of the present disclosure.

FIG. 4 is a flowchart of a method for controlling a television device according to an embodiment of the present disclosure. Please refer to FIG. 4. The method for controlling a television device in the embodiment is suitable for being implemented in a television device, such as the previously described television device 12 or 22, and portions of steps may be automatically run by a specific program. In the method of the embodiment, the method first conducts a step S400, i.e., first providing a portable device having a wireless power receiver module. As to the present embodiment, said portable device herein may be the portable device 10 or 20, correspondingly having the wireless power receiver module 106 or 206 in the foregoing embodiments.

Next, a step S402 is performed for receiving a parental control signal. Taking the television device 12 or 22 as an example, the step S402 is performed in the display control module 124 or 224 in the foregoing embodiments. After the display control module 124 or 224 receives the parental control signal emitted from the portable device 10 or 20, the television device 12 or 22 will initiate a specific program to run subsequent steps or open an on-screen display (OSD) menu for users to decide if subsequent steps shall be performed. In particular, the remote control receiver unit 2202 in the television device 22 will generate the first control signal G1 representing the parental control signal and transmit the signal G1 to the processing unit 2208 after receiving the parental control signal. Please note that the parental control signal may be generated by pressing a button on the television device 12 or 22 as well in other embodiment and is unnecessarily from the portable device 10 or 20.

Then, in a step S404, a wireless power transmitter module detects whether a wireless power receiver module is within a predetermined range so as to generate a first detection result. The wireless power transmitter modules 122 and 222 can be employed to perform the step S404. Taking the television device 22 as an example, in the step S404 the feedback detector unit 2204 detects the coil current in the wireless power receiver module 206 and sends the feedback detection signal L1 (a current value or a voltage value) to the microcontroller unit 2206. The microcontroller unit 2206 confirms whether the portable device 20 is nearby based on the feedback detection signal L1 and accordingly generates the second control signal G2. The numerical value of the second control signal G2 represents the "positive" or "negative" first detection result and is sent to the processing unit 2208.

If the first detection result in the step S404 is negative, the method directly jumps to a step S406 to terminate operation of the program. If the first detection result in the step S404 is "positive", a step S408 will be performed, i.e., selectively enabling the parental control function according to the parental control signal and the first detection result. In the present embodiment, while the first detection result is positive, the display control module 124 or 224 enables the parental control function based on the first control signal G1 and the second control signal G2.

Later, in a step S408, it is again detected whether the wireless power receiver module is located within the same predetermined range so as to generate a second detection result. Similarly, taking the television device 22 as an example, in the step S408 the feedback detector unit 2204 detects the coil current in the wireless power receiver module 206 and sends the feedback detection signal L1 (a current value or a voltage value) to the microcontroller unit 2206. The microcontroller unit 2206 confirms whether the portable device 20 is nearby based on the feedback detection signal L1 and accordingly generates the second control signal G2. The numerical value of the second control signal G2 represents the "positive" or "negative" second detection result and is sent to the processing unit 2208.

Finally, in terms of the second detection result, a step S410 is performed to control the television device to turn on, turn off or enter into a standby mode. In the present embodiment, the display control module 224 automatically turns off the television device 12 or 22 in response to the "negative" second detection result.

To prevent children from turning on the television device through pressing a button on the television device, the method in the present embodiment further sets the television device into a disabled status (step S412), making buttons on the television device functionless, and no one can turn on the television device by pressing buttons on the television device.

To summarize, the disclosed method for controlling a television device and the disclosed television control system treat detecting a wireless power receiver module in a portable device as a way to enable a parental control function. Such technical feature not only can latch the television device but also combine with advantages of wireless charging. Thus, the method and the television control system in the disclosure have effects of preventing children from turning on televisions at will and being environmental friend.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A method for controlling a television device having a wireless power transmitter module, comprising:
    providing a portable device having a wireless power receiver module;
    receiving a parental control signal;
    measuring an induced current in a coil of the wireless power transmitter module during a period of transporting power;
    detecting whether the wireless power receiver module is located within a predetermined range according to the measured value of the induced current, so as to generate a first detection result;
    selectively enabling a parental control function based on the parental control signal and the first detection result;
    detecting again whether the wireless power receiver module is located within the predetermined range so as to generate a second detection result; and
    controlling the television device to turn on, turn off or enter into a standby mode based on the second detection result.

2. The method of claim 1, wherein the parental control function is enabled when the first detection result indicates that the wireless power receiver module is located within the predetermined range.

3. The method of claim 1, further comprising latching the television device into a disabled state after controlling the television device to turn on, turn off or enter into the standby mode, so that the television device cannot be turned on through pressing a button on the television device.

4. The method of claim 1, wherein receiving the parental control signal comprises:
    utilizing a remote control receiver unit to receive the parental control signal transmitted from the portable device or generated through pressing a button on the television device, so as to generate a first control signal.

5. The method of claim 4, wherein detecting whether the wireless power receiver module is located within the predetermined range comprises:
    utilizing a feedback detector unit to measure electric current or voltage within the wireless power receiver module to generate a feedback detection signal accordingly; and
    generating a second control signal based on the feedback detection signal.

6. The method of claim 5, wherein selectively enabling the parental control function comprises enabling the parental control function based on the first control signal and the second control signal.

7. A television control system comprising:
    a portable device comprising:
    a power supply module;
    a remote control module coupled to the power supply module and configured to emit a parental control signal; and
    a wireless power receiver module coupled to the power supply module and configured to sense variation of a magnetic field to generate an induced electromotive force, so as to electrically charge the power supply module; and
    a television device comprising:
    a wireless power transmitter module having a feedback detector unit, the feedback detector unit adapted for measuring an induced current in a coil of the wireless power transmitter module during a period of transporting power and detecting whether the wireless power receiver module is located within a predetermined range according to the measured value of the induced current; and
    a display control module coupled to the wireless power transmitter module, receiving the parental control signal, and, according to a detection result of the feedback detector unit, selectively enabling a parental control function or controlling operation of the television device.

8. The television control system of claim 7, wherein the display control module comprises a remote control receiver unit configured to receive the parental control signal to generate a first control signal.

9. The television control system of claim 8, wherein the feedback detector unit generates a feedback detection signal when the wireless power receiver module is detected being located within the predetermined range, the wireless power transmitter module further comprising:
    a microcontroller unit coupled to the feedback detector unit and generating a second control signal based on the feedback detection signal.

10. The television control system of claim 9, wherein the display control module further comprises:
    a processing unit coupled with the remote control receiver unit and the microcontroller unit, the processing unit enabling the parental control function or controlling operation of the television device based on the first control signal and the second control signal.

\* \* \* \* \*